June 21, 1955     D. SPINETTA     2,711,251

FILTERING APPARATUS

Filed March 4, 1954     2 Sheets-Sheet 1

INVENTOR
DOMINIQUE SPINETTA

BY
*Adams + Bush*
ATTORNEYS

June 21, 1955
D. SPINETTA
2,711,251
FILTERING APPARATUS
Filed March 4, 1954
2 Sheets-Sheet 2
FIG. 3.
FIG. 2.
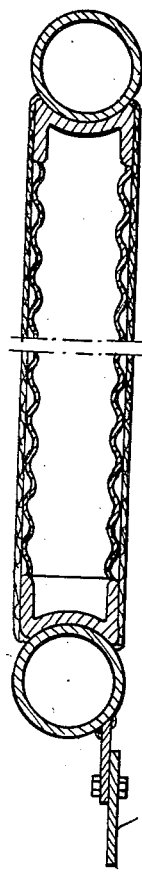
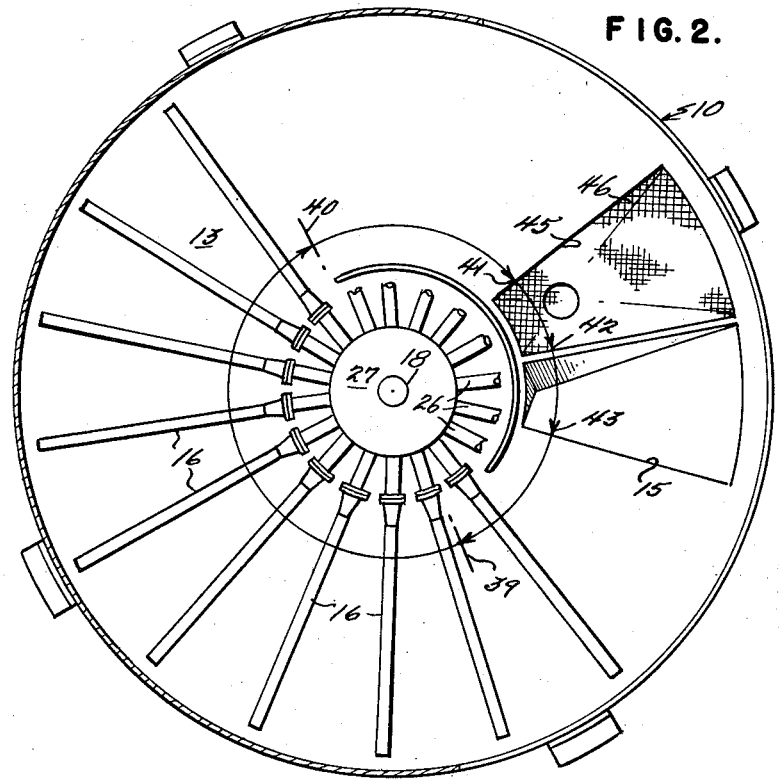
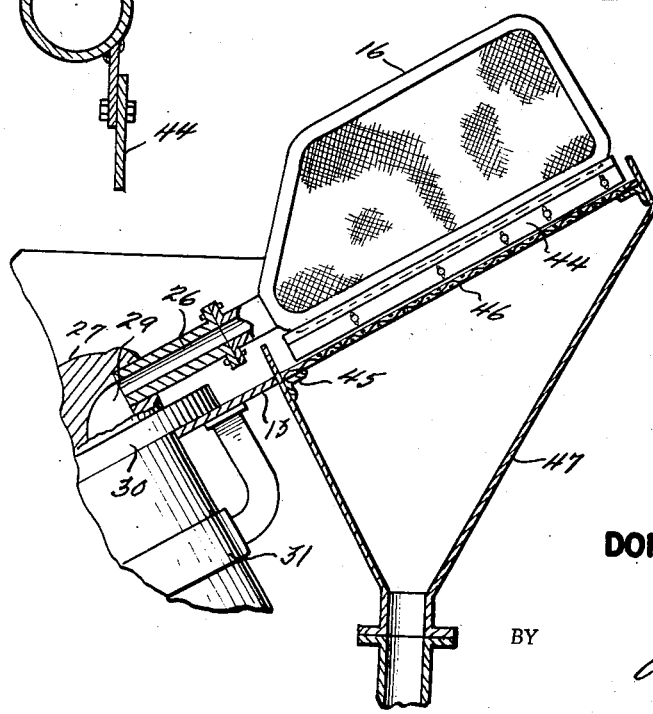
FIG. 6.
INVENTOR
DOMINIQUE SPINETTA
BY
*Adams + Bush*
ATTORNEYS

United States Patent Office 2,711,251
Patented June 21, 1955

2,711,251

FILTERING APPARATUS

Dominique Spinetta, Fontainebleau, France, assignor to Societe Mines et Industries, Paris, France, a company of France Application March 4, 1954, Serial No. 414,118

Claims priority, application France March 4, 1953

4 Claims. (Cl. 210—202.5)

This invention relates to filtering apparatus and has more particular reference to filtering machines of the vacuum type.

One object of the present invention is to provide a novel and improved vacuum filtering machine designed to treat liquids containing either fine or coarse products.

Another object of the present invention is to provide a filtering machine, as characterized above, including a generally cylindrical trough or tank having a bottom inclined to the horizontal, a plurality of filtering elements rotatably mounted in the tank for lifting the solid products up to an evacuation duct formed in the elevated end portion of the inclined bottom of the trough so that the solid material will be evacuated therethrough.

Another object of the invention is to provide apparatus, as characterized above, wherein the filtering devices are each adapted to be connected to suction during the movement of the filtering devices through the liquid and are adapted to be connected to a source of compressed air to blow off the caked fine products held on the filter element at a point adjacent the evacuation duct so that they may be evacuated therethrough.

Another object of the invention is to provide filtering apparatus, as characterized above, wherein each of the filtering elements are provided with scraping means for raising the heavy products up the inclined bottom of the trough to the evacuation outlet therein.

A further object of the invention is to provide filtering apparatus, as characterized above, wherein a sieved second opening is formed in the upper portion of the trough bottom so that the liquid carried by the scrapers may be drained off before the coarse products are evacuated through the evacuation duct.

Other objects and advantages of the invention will appear in the following description, when considered in connection with the accompanying drawings, wherein:

Fig. 2 is a horizontal sectional view, taken on the line 2—2 of Fig. 1;

Fig. 3 is an enlarged vertical sectional view through one of the filtering elements;

Fig. 6 is an enlarged fragmentary elevational view, partly in section, showing the details of the upper end of the tank bottom.

Figure 1:
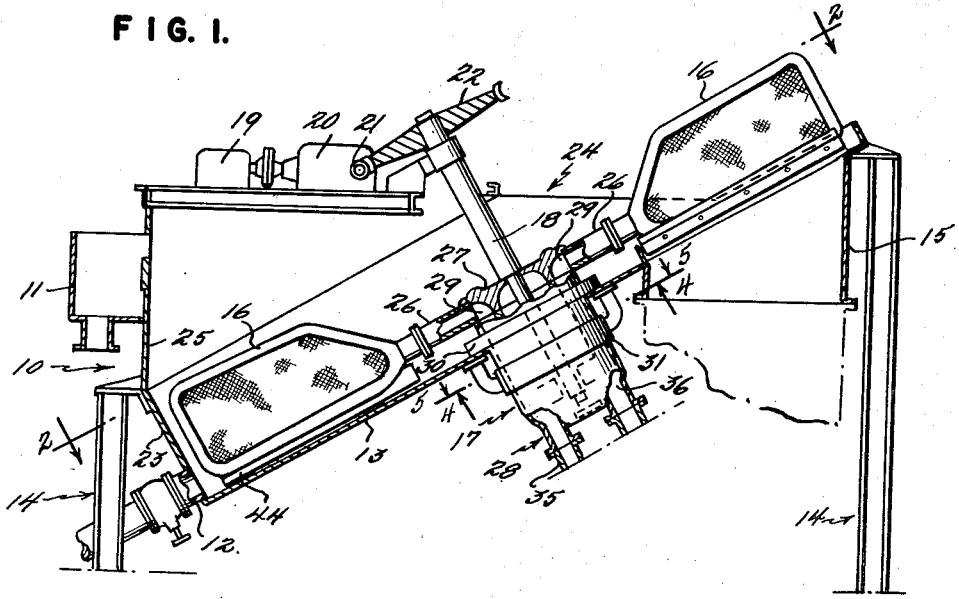
Fig. 1 is a vertical sectional view of one embodiment of filtering machine constructed in accordance with the present invention.

Referring now to the drawings, there is shown one embodiment of filtering apparatus constructed in accordance with the present invention and comprising a tank or trough 10 provided with an adjustable overflow 11, and a valved discharge conduit 12, and having a flat bottom wall 13 inclined to the horizontal so that its elevated end portion will be above the liquid level in the tank; suitable framework, indicated generally at 14, for supporting the tank in upright position; an outlet conduit 15 connected to the elevated end portion of the bottom wall of the tank for communication therewith for the evacuation of solid particles therefrom; a plurality of filtering elements 16 rotatably mounted in the tank for removing the solid particles from the liquid therein; a control valve distributive assemblage for alternately connecting the filtering elements 16 to a source of suction and a source of compressed air, indicated generally at 17; a rotatable shaft 18 extending perpendicular to and through the bottom wall of the tank with its lower end suitably journaled in bearings carried by the control valve assemblage 17, and with its upper end suitably journaled in a bearing bracket mounted on the tank; a motor 19 for driving the shaft and through it the filtering elements 16 at a constant speed, through suitable reduction gearing 20, endless worm 21, and a gear wheel 22.

In the particular embodiment of the invention illustrated, the tank 10 is shown as being generally cylindrical, the lower portion of the side wall of the tank being formed by a cylindrical plate 23 secured to the periphery of and extending perpendicular to the bottom wall 13 of the tank. The portion of the cylindrical plate 23 surrounding the elevated end portion of the bottom wall is cut away, as indicated at 24, as this portion of the tank is well above the liquid level for normal operation of the tank, and a vertically extending arc-shaped plate 25 secured to and extending along the upper periphery of the portion of the plate 23 which has not been cut away (see Fig. 1).

The filtering elements 16 may be of any suitable usual type or shape. In the particular embodiment thereof illustrated, they are shown as being elongated generally rectangular racket shaped members having a tubular frame and corrugated lateral outer walls above which filter cloths are fitted. Each filtering element is connected to the upper portion of the control valve assemblage 17 by means of a suction conduit 26.

The control valve distributive assemblage 17 for alternately connecting the filtering elements 16 to a source of vacuum or suction and a source of compressed air, may be of any suitable usual type. In the particular embodiment of the invention illustrated, this assemblage comprises a rotary valve member 27 attached to the shaft 18 for rotation therewith; and a stationary manifold valve member 28.

Figure 4:
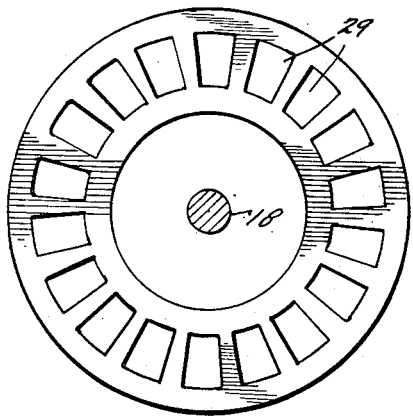
Fig. 4 is an enlarged bottom face view of the rotatable valve plate, taken on the line 4—4 of Fig. 1.

The valve member 27 is provided with a plurality of circumferentially spaced fluid passageways 29, each in communication with one of the conduits 26. The lower portion of the member 27 extends through a suitable water-tight bearing 30 mounted on the bottom wall of the tank with the surface of its bottom end in rotative sliding engagement with the upper surface of the stationary manifold valve member 28. The stationary manifold assemblage 28 is fixedly secured to the under surface of the bottom wall of the tank and comprises an annular member 31 having a suction compartment 32 and a pressure compartment 33, separated as by partition 34. The suction compartment is of relatively large angular extent and is connected to a vacuum line 35 for maintaining the desired suction therein and for withdrawing filtered liquid from the apparatus. The pressure compartment is of relatively small angular extent and is connected to a compressed air line 36 for supplying the desired pressure for loosening the filtered solids or cake from the filtering elements. The suction compartment communicates with an opening or port 37 opening through the upper face of the stationary member in position to register successively with the openings or passageways 29 in the bottom face of the rotatable valve member 27, while the pressure compartment communicates with an opening or port 38 also adapted to register with the successive openings or passageways 29 in the rotative valve member 27 (see Figs. 4 and 5).

Figure 5:
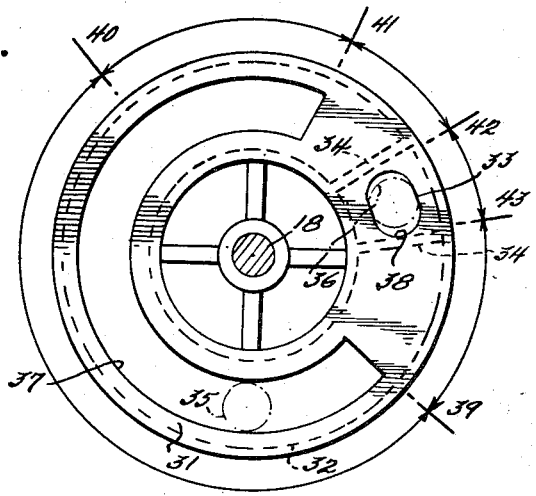
Fig. 5 is an enlarged face view of the stationary valve plate, taken on the line 5—5 of Fig. 1.

The arrangement and positioning of the channels or ports 37 and 38 are such that as each filtering element enters the liquid in the tank, the filtering element will be caused to communicate with the channel 37 and suction will be created within the filtering element, the filtering takes place between point 39 and point 40 (see Figs. 2 and 5). From point 40 to point 41, where the filtering element moves out of the liquid, the vacuum will cause the drying of the caked product on the filtering element; from point 41 to point 42 there is a dead period, between points 42 and 43 the filtering element is in communication with the channel 38 and compressed air is automatically injected into the filtering element for removing the cake from the element so that it may be discharged from the apparatus through outlet 15. The filtering element between point 43 and point 39 also corresponds to a dead period.

The bottom part of each filtering element is fitted with a scraping device 44 for pushing in front of it on the inclined bottom of the tank the granular particles of any size which settle onto the bottom of the tank, so that the coarse particles can be evacuated through outlet 15. The coarse particles will drain as they are pushed up the inclined upper surface of the bottom of the tank. However, in order to provide for a more complete draining of the coarse particles, an opening 45 may be provided in the elevated end portion of the inclined bottom of the tank. The opening 45 is provided with a sieve 46 and communicates with a bunker 47. The bunker 47 is adapted to be connected to a suction so that as the coarse particles are moved across the sieve the vacuum beneath the sieve completes the drying, the residuary moisture passing into the bunker, from which it may be returned to the feed end of the tank so that any fine products it may contain may be removed by the filtering elements.

From the foregoing, it readily will be seen that there has been provided a novel and improved vacuum filtering apparatus designed to remove the coarse as well as the fine solid particles from a liquid; one in which the vacuum filtering elements, in addition to removing the fine solid particles, also form part of an endless conveyor system and lift up the coarse products settling on the sloping bottom of the tank filter.

Obviously, the invention is not restricted to the particular embodiment thereof herein shown and described.

What is claimed is:

1. Apparatus for filtering liquids comprising a tank for holding the liquid, said tank having a bottom wall inclined to the horizontal with the elevated end portion thereof having an evacuation outlet formed therein and positioned above the normal liquid level in the tank; a plurality of generally rectangular vacuum filtering elements mounted within said tank for rotation in a circular path about a common axis perpendicular to said bottom wall so that each of the filtering elements will move in and out of the liquid and across the evacuation outlet as it rotates, each of said filtering elements having a conduit connected thereto for communication with the interior thereof; valve means for connecting the other end of each of said conduits to a source of suction as the filter element moves through the liquid in the tank and to a source of compressed air as the filter moves across said evacuation outlet; and means for rotating said filtering elements, the construction and arrangement being such that as the filtering elements move through the liquid in the tank, the fine particles of solid material will be sucked onto the filtering elements and form a cake thereon and as the elements move out of the liquid and are brought into communication with the compressed air, the cake will be ejected from the filtering element for evacuation from the apparatus through the outlet opening in the bottom wall thereof.

2. Filtering apparatus as set forth in claim 1, wherein each of said filtering elements carries a scraper element attached to its bottom edge and positioned adjacent the bottom wall of the tank for pushing the coarse particles up the inclined bottom wall of the tank for removal through said evacuation outlet.

3. Apparatus as set forth in claim 2, wherein the bottom wall of said trough is provided with a sieve covered opening therein in its elevated end portion at a point spaced from said evacuation outlet in a direction opposed to the direction of rotation of said filtering elements, whereby any liquid associated with the coarse particles as they are pushed across the sieve by the scraper element mounted on the filtering element will be drained through said sieved opening.

4. Apparatus as set forth in claim 3, including a container mounted on the underside of said bottom wall in communication with said sieved opening to receive the liquid evacuated therethrough, said container being adapted to be connected to a source of suction to facilitate the removal of all liquid from the coarse particles as they move across said sieved opening.

References Cited in the file of this patent
UNITED STATES PATENTS

| | | |
|---|---|---|
| 1,979,990 | Newton | Nov. 6, 1934 |
| 1,992,005 | Goldsborough | Feb. 19, 1935 |
| 2,037,134 | Jaeger | Apr. 14, 1936 |